United States Patent [19]
Meier

[11] Patent Number: 4,550,979
[45] Date of Patent: Nov. 5, 1985

[54] TESTING APPARATUS INCLUDING A VACUUM-TIGHT RADIATION WINDOW

[75] Inventor: Hans-Jürgen Meier, Aalen, Fed. Rep. of Germany

[73] Assignee: Carl-Zeiss-Stiftung, Heidenheim, Fed. Rep. of Germany

[21] Appl. No.: 620,187

[22] Filed: Jun. 13, 1984

[30] Foreign Application Priority Data

Jul. 15, 1983 [DE] Fed. Rep. of Germany ....... 3325581

[51] Int. Cl.⁴ .......................... G02B 7/00; G02B 27/00
[52] U.S. Cl. ..................................... 350/321; 350/253; 350/167
[58] Field of Search ............... 350/321, 319, 167, 253, 350/574, 589; 73/327

[56] References Cited

U.S. PATENT DOCUMENTS

| | | | |
|---|---|---|---|
| 3,768,035 | 10/1973 | Zar | 350/319 |
| 3,848,961 | 11/1974 | Champeau | 350/319 |
| 3,899,243 | 8/1975 | Haverkamp | 350/319 |
| 4,154,506 | 5/1979 | Yevizk | 350/253 |
| 4,395,775 | 7/1983 | Roberts et al. | 350/319 |

*Primary Examiner*—Jon W. Henry
*Attorney, Agent, or Firm*—Walter Ottesen

[57] ABSTRACT

The invention in directed to a radiation window for a test container in which satellites are tested under conditions in outer-space. The radiation window is made up of a plurality of individual lens elements arranged one next to the other. These lens elements are part of the conductor system through which an intensive radiation source illuminates a device to be tested such as a satellite to simulate the radiation of the sun.

6 Claims, 3 Drawing Figures

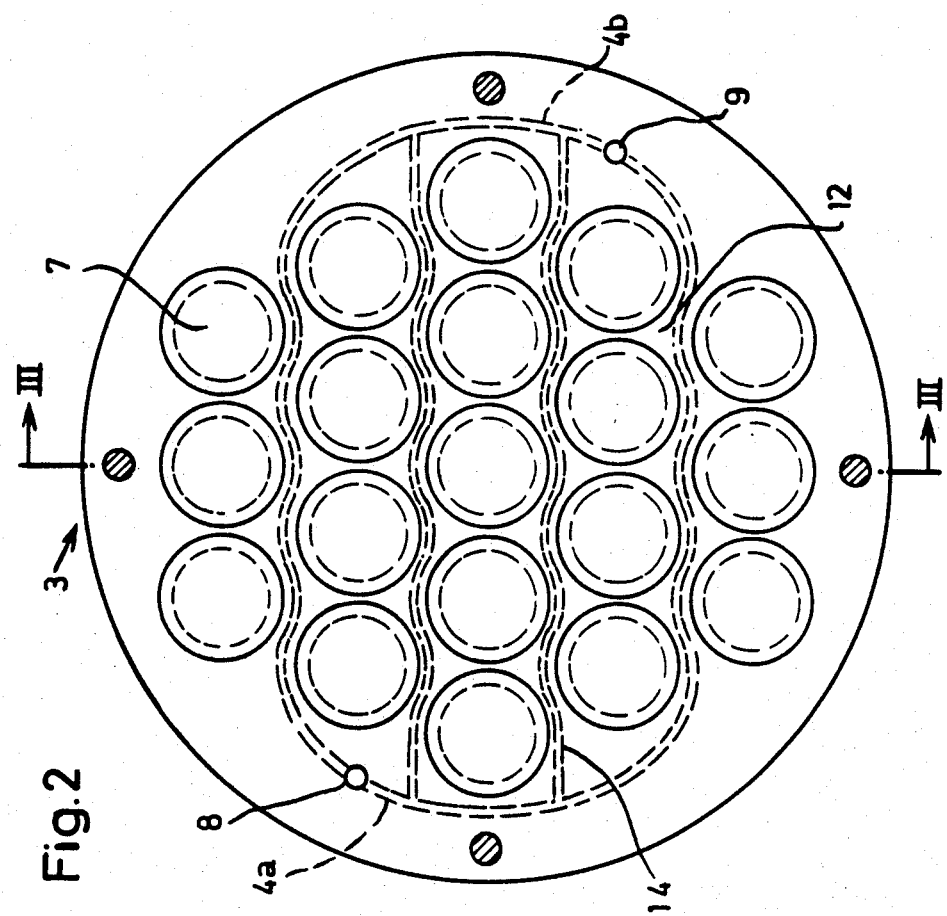

TESTING APPARATUS INCLUDING A VACUUM-TIGHT RADIATION WINDOW

BACKGROUND OF THE INVENTION

It is the practice to subject satellites to a test program before they are placed in orbit wherein outer-space conditions among others are simulated. For this purpose, the satellite is placed in a vacuum chamber and is then irradiated intensively on one side. The source of radiation is disposed outside of the vacuum chamber which is provided with a radiation window through which the satellite can be illuminated. In known testing apparatus, the radiation window is a one-piece flat glass plate.

The light power required to simulate the sun which passes through the radiation window is in the order of magnitude of several hundred kilowatts. It is therefore unavoidable that the radiation window becomes heated as a consequence of the unpreventable absorption of a portion of the radiation. The glass from which the window is made must have the smallest possible thickness and a good transparency in order to hold the light loss and the thermal loading of the window as small as possible. However, glasses with the smallest absorption are not available in the large diameter needed for the window. Furthermore, the pressure difference at the window with large diameters requires that also a relatively large minimum thickness be maintained because of reasons of stability.

Accordingly, opposed requirements are placed upon the window with respect to optical and mechanical viewpoints which make it into a critical component. In the event of breakage of the window, for example, because of thermal or mechanical tension in the glass, an explosive pressure equalization through the cross-section having an order of magnitude of one square meter and defined by the window can be expected which can lead to considerable damage.

SUMMARY OF THE INVENTION

It is an object of the invention to provide a collector equipped with a vacuum-tight radiation window which has a low absorption with a high resistance to breakage especially for large diameters.

The invention is applicable to testing apparatus equipped with a container wherein a device such as a satellite can be tested under outer-space conditions by subjecting the apparatus to radiation from a radiation source. A collector forms part of the radiation source and, as a feature of the invention, includes a vacuum-tight radiation window arranged with respect to the container. The radiation window itself includes a frame mounted with respect to the container and a plurality of lens elements are mounted in the frame so as to be disposed one next to the other.

To focus the light provided by the radiation source, it is anyhow necessary to provide a condensor with respect to which a field of lenses is provided in lieu of an individual lens because of the required large beam cross-section. The field of lenses is made up of a plurality of lens elements having a minimum diameter and which are arranged one next to the other. If one of these lens fields is built into the testing container in a vacuum-tight manner, the separate flat window can be dispensed with.

This solution has several advantages. Because the window itself is part of the condensor, it is at a location whereat the illuminating radiation path has its smallest cross-section so that the overall diameter can be held to a low value. Furthermore, the frame made of metal has a far greater strength than a window made completely out of glass. Because of the much smaller diameter of the individual lens elements as compared with a total window, the thickness of the glass can be greatly reduced and glasses of highest transparency can be utilized which has as a consequence a reduced absorption of the radiation in the glass and a reduction of the thermal loading of the window.

In the event of a glass breakage of the lens elements, the consequent damage remains less because the leakage cross-section is only a fraction of the total window.

It is advantageous to provide cooling channels in the frame in which the lens elements of the window are held and by means of which energy absorbed in the window can be conducted away. Furthermore, it is purposeful to mount the radiation window on the vacuum tank equipped therewith so as to be moveable in the direction of the light so that the influence of thermal effects on the focusing condition of the optics can be compensated for.

BRIEF DESCRIPTION OF THE DRAWING

The invention will now be described with reference to the drawing wherein:

FIG. 2 shows a front elevation view of the vacuum-tight radiation window; and,

FIG. 3 is an elevation view, partially in section, of the radiation window of the testing apparatus of FIG. 1 taken along line III—III of FIG. 2.

DESCRIPTION OF THE PREFERRED EMBODIMENTS OF THE INVENTION

Figure 1:
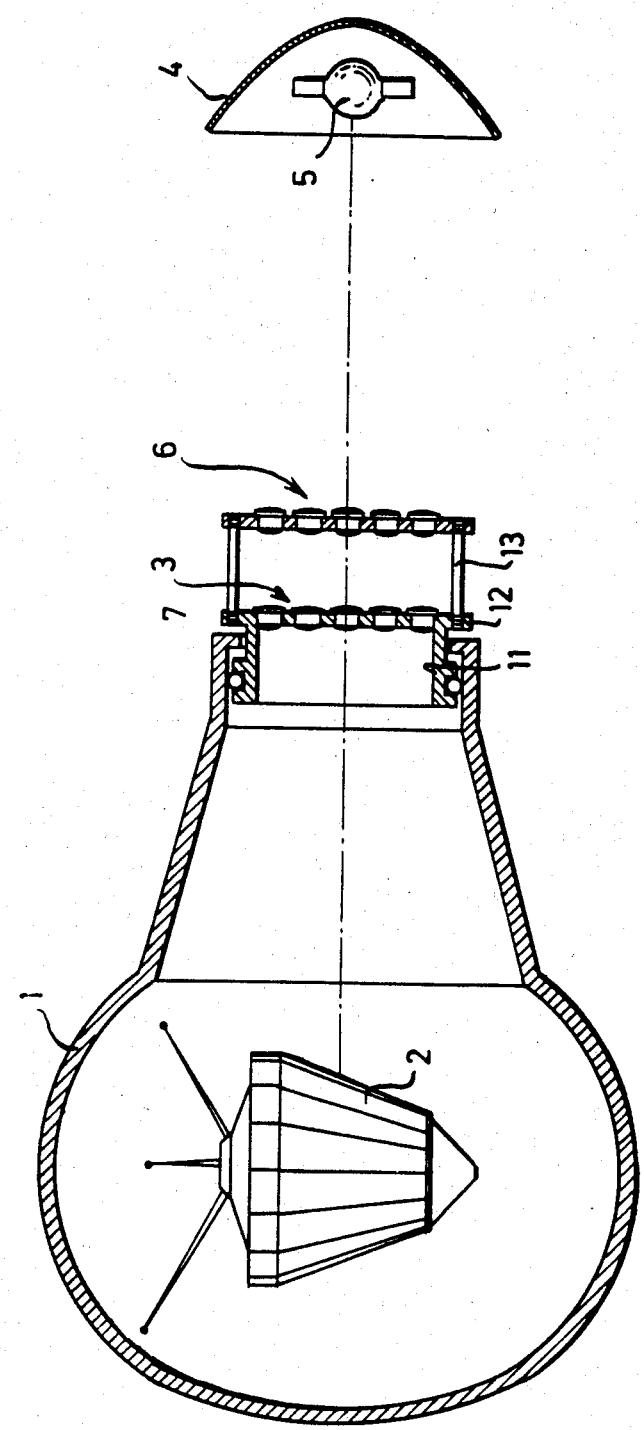
FIG. 1 is a schematic representation of a testing apparatus for simulating conditions in outer-space equipped with a vacuum-tight radiation window as required by the invention.

In FIG. 1, reference numeral 1 designates a test chamber configured as a vacuum container in which the test subject 2 is located which can, for example, be a space satellite. The test subject 2 is illuminated from an intense light source 5 arranged outside of the container 1 to simulate the sun. In FIG. 1, only a single illuminator with reflector 4 is illustrated. Actually however, a larger number of, for example, high-pressure xenon lamps are arranged one next to the other to provide the required high radiation energy of several hundred kilowatts.

A window 3 is seated in part 11 of the container 1 and comprises a plurality of lens elements 7 arranged one next to the other. These lens elements 7 conjointly define with a second lens field 6, the condensor system of the light source 5. The part 11 of container 1 which carries these optics, is displaceable along the optical axis in order to compensate for changes of optical data of the projection system caused by heating.

FIGS. 2 and 3 show the window 3 in an enlarged scale. It includes a metal frame 12 which carries nineteen individual lenses 7 in the tightest possible packing. Cooling canals 4 are formed in the web structure between the lenses 7 which connect an inlet stub 9 and an outlet stub 8 with each other. The lenses have a flange-like collar 15 on the side thereof facing the light source. These collars 15 press against the metal frame 12 because of the outside or ambient pressure. A sealing ring 10 is placed between this collar and the metal frame 12 for each lens element. The frame 12 furthermore includes four bolts 13 fixedly mounted thereto for carrying the frame of the lens field 6.

It is understood that the foregoing description is that of the preferred embodiments of the invention and that various changes and modifications may be made thereto without departing from the spirit and scope of the invention as defined in the appended claims.

What is claimed is:

1. In a testing apparatus equipped with a container wherein a device such as a satellite can be tested under outer-space conditions by subjecting the apparatus to radiation from a radiation source, the container having an opening for admitting the radiation into the interior thereof and the radiation source including a collector comprising: a vacuum-tight radiation window mounted on said container to conduct the radiation through said opening, said radiation window including frame means mounted on said container; and, a plurality of lens elements mounted in said frame means so as to be disposed one next to the other.

2. The collector of claim 1, comprising: cooling means for conducting away heat energy from said lens elements generated by the radiation passing therethrough.

3. The collector of claim 2, said frame means being a web-like structure defining a plurality of apertures for accommodating corresponding ones of said plurality of lens elements; and, said cooling means including cooling channels formed in said web-like structure for conducting a cooling fluid therethrough for removing said heat energy.

4. A testing apparatus wherein a device such as a satellite can be tested under outer-space conditions by subjecting the apparatus to radiation from a radiation arrangement including a radiation source, the testing arrangement comprising:

a vacuum tank for accommodating the device to be tested, said vacuum tank having an opening formed therein; and, condensor means forming part of said radiation arrangement for conducting the radiation of said radiation source into said vacuum tank; said condensor means including:

a vacuum-tight radiation window including frame means and a plurality of lens elements mounted in said frame means so as to be disposed one next to the other; and, mounting means arranged in said opening of said vacuum tank for movably mounting said radiation window on said tank for movement in the direction of the radiation.

5. The testing apparatus of claim 4, said condensor means including cooling means for conducting away heat energy from said lens elements generated by the radiation passing therethrough.

6. The testing apparatus of claim 5, said frame means being a web-like structure held in said mounting means and defining a plurality of apertures for accommodating corresponding ones of said plurality of lens elements; and, said cooling means including cooling channels formed in said web-like structure for conducting a cooling fluid therethrough for removing said heat energy.

* * * * *

UNITED STATES PATENT AND TRADEMARK OFFICE
CERTIFICATE OF CORRECTION

PATENT NO. : 4,550,979
DATED : November 5, 1985
INVENTOR(S) : Hans-Jürgen Meier

It is certified that error appears in the above-identified patent and that said Letters Patent is hereby corrected as shown below:

In the abstract, on line 1 thereof: delete "in" and substitute -- is -- therefor; and, In the abstract, on line 6 thereof: delete "conductor" and substitute -- condensor -- therefor.

Signed and Sealed this

Sixth Day of May 1986

[SEAL]

Attest:

DONALD J. QUIGG

Attesting Officer     Commissioner of Patents and Trademarks